(12) United States Patent
Bushkin et al.

(10) Patent No.: US 10,783,151 B1
(45) Date of Patent: Sep. 22, 2020

(54) POPULARITY-BASED CONTENT FEED MANAGEMENT SYSTEM

(71) Applicant: Amazon Technologies, Inc., Seattle, WA (US)

(72) Inventors: Leopold Bushkin, Bellevue, WA (US); Rajendra Kumar Vippagunta, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 457 days.

(21) Appl. No.: 15/197,429

(22) Filed: Jun. 29, 2016

(51) Int. Cl.
*G06F 16/24* (2019.01)
*G06F 16/28* (2019.01)
*G06F 16/2457* (2019.01)
*H04L 29/08* (2006.01)

(52) U.S. Cl.
CPC ...... *G06F 16/24578* (2019.01); *G06F 16/285* (2019.01); *H04L 67/18* (2013.01); *H04L 67/22* (2013.01); *H04L 67/26* (2013.01)

(58) Field of Classification Search
CPC ......... G06F 17/30867; G06F 17/30091; G06F 17/3053; G06F 16/24578; G06F 16/285; G06F 16/338; G06F 16/48; G06F 16/583; G06F 16/90324; G06F 16/35; G06F 16/435; G06F 16/90335; G06F 3/0482; G06F 16/258; G06F 16/13; G06F 16/2428; H04L 65/403; H04L 67/22; H04L 67/306; H04L 67/18; H04L 67/26
See application file for complete search history.

(56) References Cited

U.S. PATENT DOCUMENTS

| | | | |
|---|---|---|---|
| 6,738,881 B1 | 5/2004 | Olliver et al. | |
| 7,359,972 B2 | 4/2008 | Jorgensen | |
| 8,356,100 B2 | 1/2013 | Zhu et al. | |
| 9,053,124 B1 | 6/2015 | Dornquast | |
| 9,317,185 B2 * | 4/2016 | Martin | G11B 27/105 |
| 9,876,637 B2 | 1/2018 | Gauda | |
| 10,154,116 B1 | 12/2018 | Bushkin et al. | |
| 10,277,663 B1 | 4/2019 | Andaz et al. | |
| 2004/0091116 A1 | 5/2004 | Staddon | |
| 2005/0175027 A1 | 8/2005 | Miller et al. | |
| 2005/0238040 A1 | 10/2005 | Vitebsky et al. | |
| 2007/0247395 A1 | 10/2007 | Barraclough | |
| 2008/0285487 A1 | 11/2008 | Forslow | |

(Continued)

*Primary Examiner* — Alford W Kindred
*Assistant Examiner* — Cecile H Vo
(74) *Attorney, Agent, or Firm* — Knobbe, Martens, Olson & Bear, LLP (57) ABSTRACT

Features are provided for proactively grouping content for personalized content feeds based on the expected relevance of the content to groups or classes of users. Such proactive grouping can allow personalized (or semi-personalized) content feeds to be delivered with low user-perceived latency. The proactive grouping may be used in conjunction with a more computationally-intensive and higher-latency process for generating personalized feeds. A user's content feed may be provided using a two-phase delivery process in which an initial set of content for the feed is provided from the proactively grouped content collection with which the user is associated. While the user is viewing the initial set of content, the second phase of the delivery process may be performed in which additional content is selected specifically for the user.

21 Claims, 5 Drawing Sheets

(56) References Cited

U.S. PATENT DOCUMENTS

| | | |
|---|---|---|
| 2009/0037500 A1 | 2/2009 | Kirshenbaum |
| 2009/0180494 A1 | 7/2009 | Ren et al. |
| 2010/0095006 A1 | 4/2010 | Broadhurst et al. |
| 2012/0005224 A1 | 1/2012 | Ahrens |
| 2012/0124219 A1 | 5/2012 | Zhu et al. |
| 2012/0317307 A1 | 12/2012 | Ravindran |
| 2012/0331091 A1 | 12/2012 | Tseng |
| 2013/0305039 A1 | 11/2013 | Gauda |
| 2014/0003421 A1 | 1/2014 | Alicherry |
| 2014/0020115 A1 | 1/2014 | Le Chevalier |
| 2014/0108643 A1 | 4/2014 | Hui |
| 2014/0237361 A1* | 8/2014 | Martin .................. G06F 3/0482 715/716 |
| 2014/0240753 A1 | 8/2014 | Anno et al. |
| 2015/0095154 A1* | 4/2015 | Kannan ................ G06F 16/9535 705/14.55 |
| 2015/0178769 A1 | 6/2015 | Mirisola |
| 2015/0271233 A1 | 9/2015 | Bouazizi |
| 2016/0344832 A1 | 11/2016 | Kukreja et al. |
| 2017/0019347 A1 | 1/2017 | Al-banna et al. |
| 2017/0180412 A1 | 6/2017 | Mikulski |
| 2017/0230939 A1 | 8/2017 | Rudolf |
| 2017/0249659 A1 | 8/2017 | Shroff |
| 2017/0255675 A1 | 9/2017 | Chavan |
| 2017/0329857 A1 | 11/2017 | Klotz, Jr. |
| 2017/0359778 A1 | 12/2017 | Chen |
| 2019/0253478 A1 | 8/2019 | Andaz et al. |

\* cited by examiner

POPULARITY-BASED CONTENT FEED MANAGEMENT SYSTEM

BACKGROUND

Generally described, computing devices and communication networks can be utilized to exchange content and other information. In a common application, a computing device can generate content to be distributed to other computing devices via a communication network. For example, a user of a computing device, such as a personal computer, laptop computer, tablet computer, or smart phone, may use the computing device to create content, such as text, documents, audio recordings, video, images, animations, and the like. The content may be transmitted directly to other users' computing devices, or the content may be transmitted to a network-accessible content server for distribution to other users' computing devices.

In some scenarios, a content server may distribute content to a computing device as a set of multiple content posts in which a user of the computing device may be interested. The set of content posts, also referred to as a "feed," may be selected from a larger set of available content posts based on the degree to which individual content posts correspond to the interests of the user. For example, a user of a social media system may be presented with a feed of content posts that match the user's interests, as determined from the user's demographic characteristics, interactions with the social media system, and the like. As another example, a user of a news service may be presented with a feed of articles based on the user's stated interests, interactions with other content provided by the news service, etc.

From the perspective of a user receiving a content feed, a user experience may be defined in terms of the degree to which content in the feed is of interest to the user. In an effort to provide the most relevant content, systems use various techniques to analyze and select, from a large set of available content, a subset of content that is relevant to a user's interests.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to proactively grouping content for content feeds based on the relevance of the content to the collective interests of a group of users. Content feeds are typically continuous streams or discrete sets of content items (or data about content items) provided to user devices, either automatically or on-demand. Proactive grouping of content refers to the grouping that occurs prior a request for, or generation of, a content feed. Such proactive grouping can allow personalized or semi-personalized content feeds to be generated for a group of users, instead of more generic content feeds that are based on overall popularity, publication time, or other factors that are unrelated to the users' collective interests. Proactive grouping can also allow personalized or semi-personalized content feeds to be generated with lower user-perceived latency than conventional personalization systems, such as systems in which content is analyzed and selected for a particular user's personalized content feed after receiving a request for the feed. In some embodiments, the proactive grouping may be used in conjunction with a more computationally-intensive and higher-latency process for generating personalized feeds. For example, a particular user's content feed may be generated using a two-phase process in which an initial set of content for the feed is provided from a proactively grouped content collection to which the user is assigned based on the user's interests. While the user is viewing the initial set of content, the second phase of the process may be performed in which additional content is selected specifically for the user, rather than being selected for the group of users with which the user is associated.

Some aspects of the present disclosure relate to the generation and use of content collections for groups of users. A content management system may have a corpus of available content items available for distribution to users. The content items may include posts, articles, stories, documents, images, videos, audio recordings, animations, some combination thereof, etc. The content items may be grouped into various content collections, also referred to as "buckets" or "bins." Each content collection may have multiple content items that are determined to be relevant to, or otherwise associated with, a particular set of users or user interests. For example, a first content collection may include content that is determined to be relevant for users who are interested in sports, music, and outdoor activities. A second content collection may include content that is determined to be relevant for users who are interested in technology, travel, and outdoor activities. As new content items are created and submitted to the content management system, the content items can be analyzed and added to zero, one, or more content collections. When a user accesses the content management system to retrieve a content feed, the content collection(s) most relevant to the user can be identified based on a predetermined content collection assignment made before the request for the feed, a dynamic analysis of the user's possible interests in response to the request for the feed, or some other method. The content management system can quickly provide the user with content from the identified content collections without the need to search all content in the corpus of available content for content that is relevant to interests of the particular user.

Additional aspects of the present disclosure relate to maintenance of the content collections as new content continues to be added to the corpus of available content, and as users continue to interact with the content management system. Over the course of time, the size of the content collections may grow and exceed some upper size threshold beyond which performance of content retrieval may suffer (e.g., larger content collections have longer lookup times, require more computing resources to store and process, etc.).

In response to this growth, the content in the content collection can be periodically re-ranked based on updated ranking parameters, such as the relative popularity of the content items at the current time, the age of the content items, etc. Once the content in a content collection has been re-ranked, the lowest-ranked content items can be removed from the collection. For example, content may be removed to bring the size of the collection back to a lower size threshold.

Further aspects of the present disclosure relate to a two-phase process for delivery of content feeds to user devices. The assignment of users to proactively-generated content collections can significantly reduce the amount of time required to provide a content feed that is at least partially personalized for the user. However, in some cases the relevance of content provided to a user may be improved by performing a user-specific analysis of available content and selecting the most relevant content based on that analysis. For example, content can be selected based on the interests, demographic characteristics, geographic location, content consumption history, and/or shopping history of the particular user, rather than relying on a somewhat more general grouping of the user with other users determined to have similar interests. In order to ensure that a user is quickly provided with relevant content and also provided with highly-personalized content, the user's content feed may be generated in two phases. In "phase 1," a selection of relevant content is provided from the predetermined content collection(s) with which the user is associated. While "phase 1" content is being provided from the content collections, a more computationally intensive "phase 2" analysis of a larger portion of the corpus of available content may be performed using user-specific interest parameters. This analysis can be used to generate "phase 2" content that is added to the user's feed. In this two-phase process, a user is quickly provided with content that the user is more likely to find interesting than content that is merely "popular" overall. In addition, the user is subsequently provided with content that is determined to be highly relevant to the specific user, including content that may not be provided to the user based on a more general grouping of users. Thus, the risk that users will no longer use the content management system due to long wait times for personalized content, or due to the lack of personalized content altogether, can be mitigated.

Although aspects of some embodiments described in the disclosure will focus, for the purpose of illustration, on particular examples of content items, content collections, grouping algorithms, and computing devices, the examples are illustrative only and are not intended to be limiting. In some embodiments, the techniques described herein may be applied to additional or alternative content, algorithms, or computing devices. Various aspects of the disclosure will now be described with regard to certain examples and embodiments, which are intended to illustrate but not limit the disclosure.

Network-Based Content Feed Delivery Environment

Figure 1:
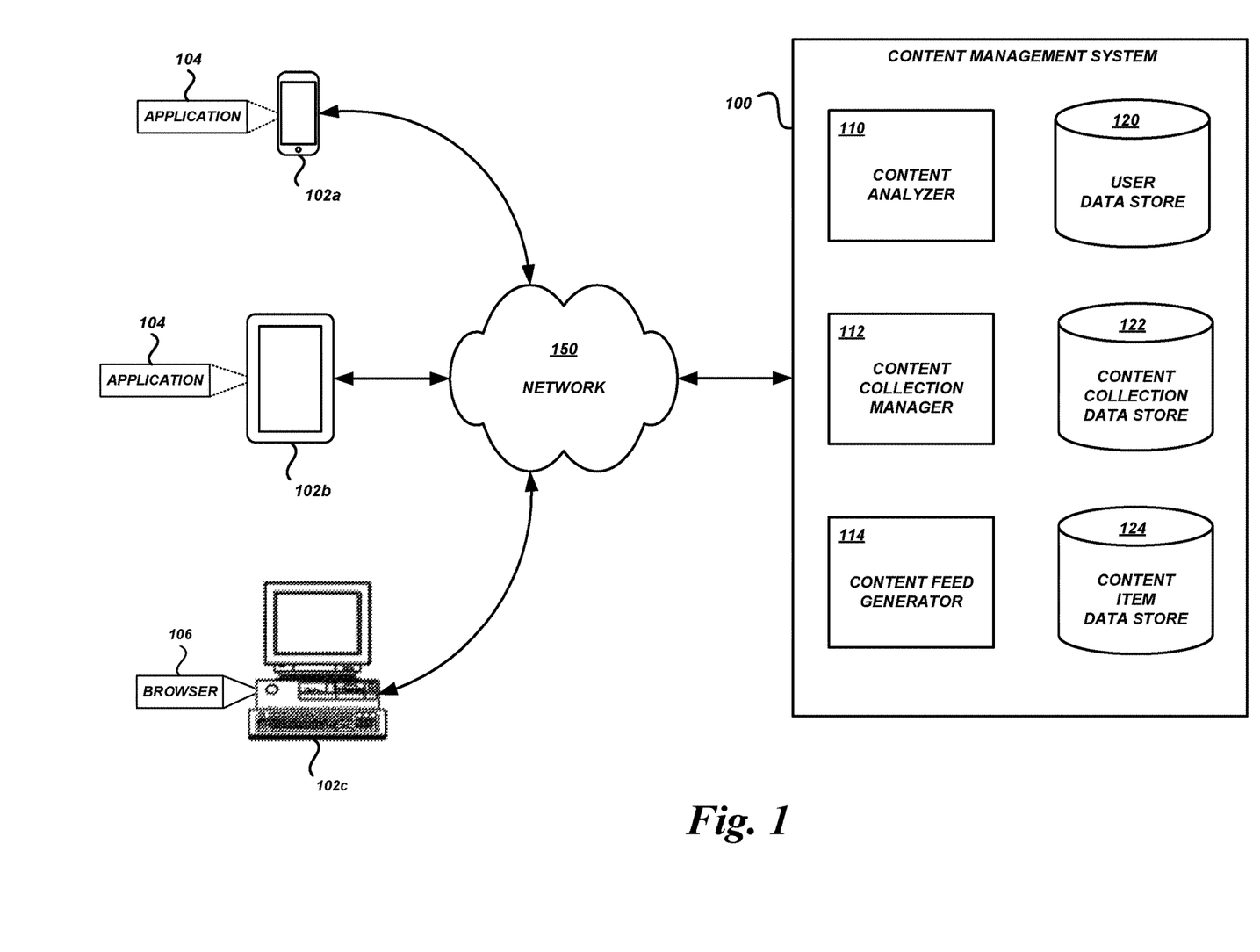
FIG. 1 is a block diagram of an illustrative computing environment including a content management system and various user devices according to some embodiments.

With reference to an illustrative embodiment, FIG. 1 shows a network environment in which aspects of the present disclosure may be implemented. As shown, the network environment may include a content management system 100 and various user devices 102*a*, 102*b*, and 102*c* (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content analyzer 110 configured to analyze content items and assign them to content collections. The content management system 100 may also include a content collection manager 112 configured to generate and maintain the content collections, including managing the growth of the content collections and periodically purging content from the content collections. The content management system 100 may also include a content feed generator 114 configured to generate and distribute content feeds to user devices.

The content management system 100 may also include various data stores to store data and/or files in connection with content feed generation. For example, the content management system 100 may include a user data store 120 to store data about individual users, including information regarding interests, demographic characteristics, browse history, user groupings, content collection associations, and the like. The content management system 100 may also include a content collection data store 122 to store information regarding content collections, including which items are included in each collection, the scoring/ranking/ordering of the content in the content collections, etc. The content management system 100 may also include a content item data store 124 to store the corpus of content items (or information about the content items) available to be distributed in content feeds.

The content management system 100 may be implemented on one or more physical server computing devices that provide computing services and resources to users. Illustratively, the content management system 100 (or individual components thereof, such as the content analyzer 110, content collection manager 112, or content feed generator 114) may be implemented on one or more blade servers, midrange computing devices, mainframe computers, desktop computers, or any other computing device configured to provide computing services and resources. In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to access content feeds and/or generate content items managed by the content management system 100. In some embodiments, a user may launch specialized application software, such as a mobile application 104 executing on a particular user device, such as a smart phone 102*a* or tablet computer 102*b*. The application 104 may be specifically designed to interface with the content management system 100 for accessing content feeds and/or generating content items. In some embodiments, a user may use other application software, such as a browser application 106, to interact with the content management system 100.

When a user accesses an application 104 on a user device 102a to retrieve a content feed, the user device 102a may transmit a content feed request to the content management system 100 via the network 150. The content management system 100 can determine which content collection or collections to use when selecting the content items to include in the content feed. For example, the content feed request may include or be preceded by information regarding the user, such as an identifier of the user or user device 102a, information regarding interests of the user, etc. The content feed generator 114 can use the information regarding the user to access the user data store 120 and determine the content collections to which the user has been assigned.

The user may be assigned to a content collection in a background or offline process, or the user may be assigned to a content collection in response to a content feed request. In some embodiments, the content management system 100 may obtain data regarding user interests, characteristics, content browsing history, and the like prior to receiving the current content feed request from the user's device (e.g., hours, days, or weeks in advance). The content management system 100 may use the data to assign the user to an existing content collection. For example, if the user shows a strong interest in three different topics, the user may be assigned to a content collection for users interested in those topics (or some subset thereof, or a set including those topics and additional topics, etc.). As another example, the content management system 100 may analyze data regarding multiple users to identify clusters of users interested in the same content type and/or subject matter. The users in a particular cluster may be assigned to the same content collection. In some embodiments, the content management system 100 may identify a content collection for the user in response to receiving the content feed request. For example, information regarding user interests may be analyzed after receipt of a content feed request, and then a content collection may be selected for servicing the current request.

Once a content collection (or multiple content collections) is identified for the user, the content feed generator 114 can select the initial content items for the content feed. The content feed generator 114 may use a variety of different techniques to select content items from the identified content collection(s). For example, the content collection may include i items (where i is a positive integer), and the content feed generator 114 may provide all i content items to the user device 102. As another example, items in the content collection may be ranked according to popularity, relevance, or some other metric or combination of metrics. The content feed generator 114 may select some subset of the i content items, such as the top x content items (where x is a positive integer) overall, the top x content items that have not yet been provided to the user device 102, etc. As yet another example, the content feed generator 114 may determine which content items of the collection are most relevant for the current user. The content feed generator 114 can generate, for each content item in the collection or some subset thereof, a user-specific score indicative of the relevance of the content item to the interests of the user. Illustratively, the score may indicate a degree to which the content item matches the user's interests, a likelihood that the user will access the content item, or some other measure of expected user interest. The content feed generator 114 may then select the top x scoring content items for the content feed.

In some embodiments, the content feed may include content from a content collection, and content identified in a user-specific analysis of other available content. For example, the content feed generator 114 may generate a content feed in multiple phases. The first phase, in which the initial content to be presented in the content feed is selected, may use the content collections described above and in greater detail below. A subsequent phase, in which the remainder of the content (or some subset thereof) to be presented in the content feed is selected, may involve generating user-specific scores for a larger number of content items than the total number of content items in the content collection. The subsequent phase of the feed generation process will generally be more time-consuming and/or resource intensive than the first phase, but may produce a selection of content items that are more likely to be of interest to the current user.

Figure 2:
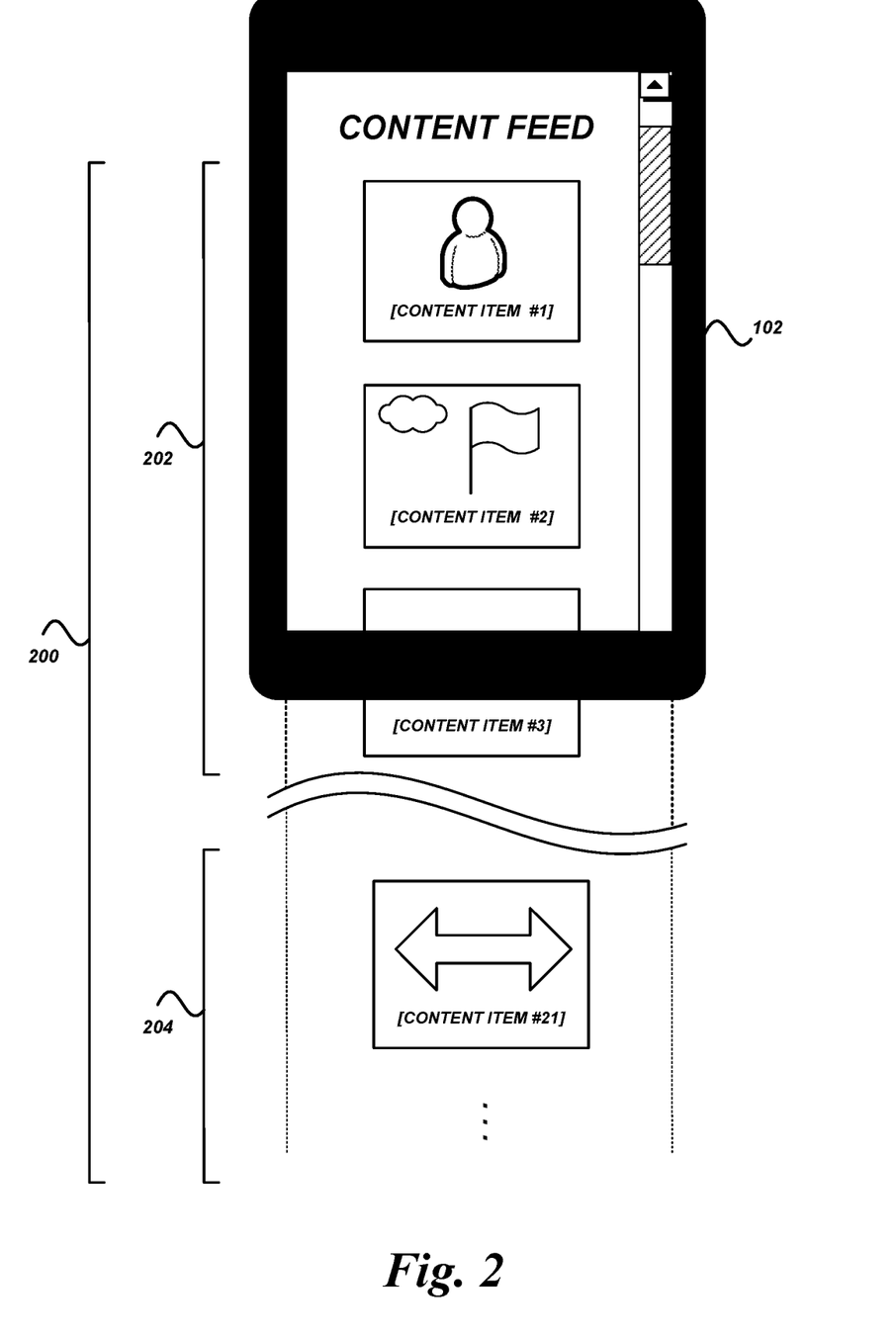
FIG. 2 is a pictorial diagram of an illustrative user device receiving and displaying a content feed according to some embodiments.
Figure 5:
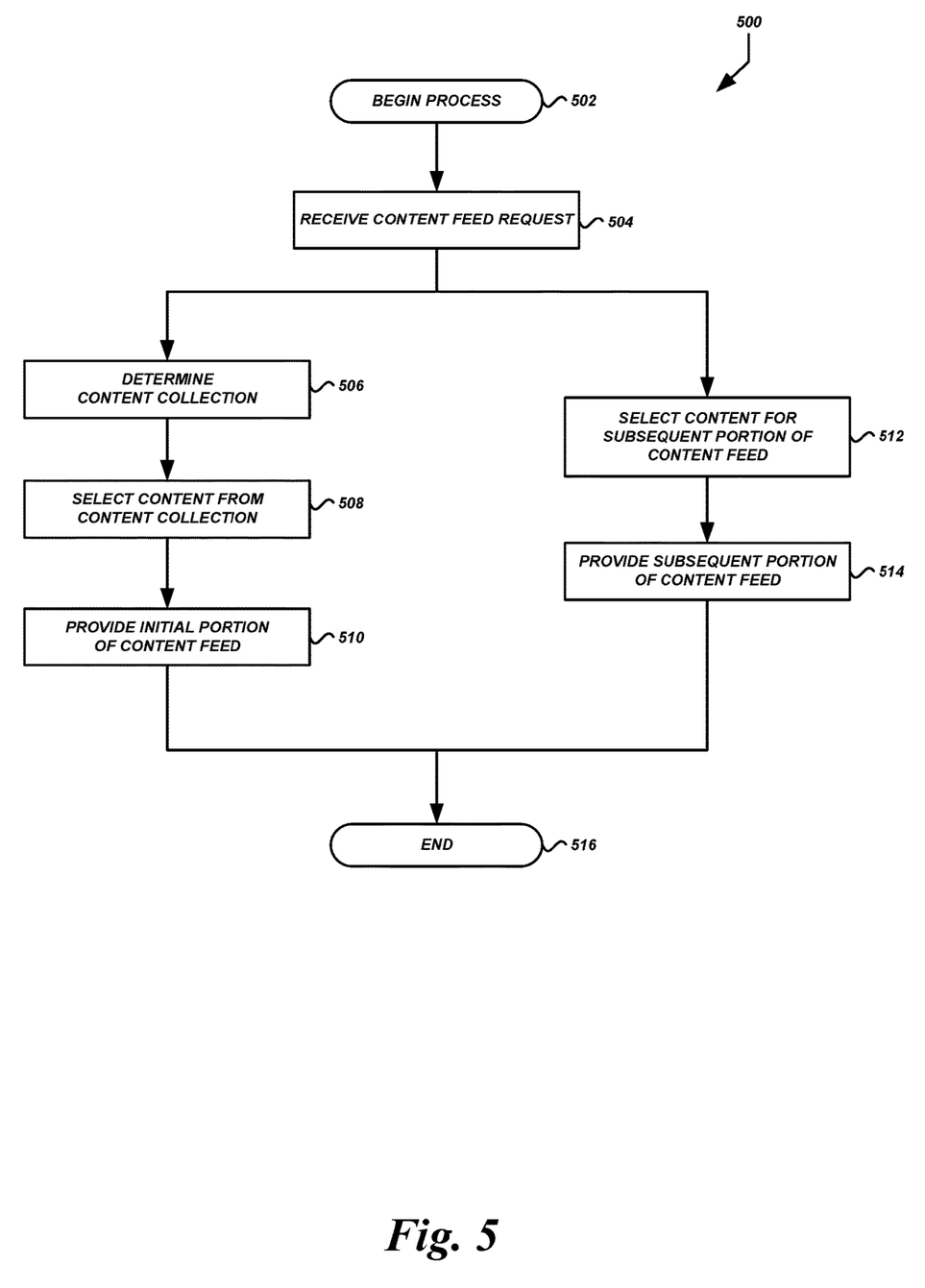
FIG. 5 is a flow diagram of an illustrative two-phase process for providing content feeds to user devices using content collections according to some embodiments.

FIG. 2 shows a user device 102 presenting a content feed 200 generated using a multi-phase process. As shown, the initial portion 202 of the content feed 200 includes several content items, and is the first portion of the content feed 200 shown on the user device 102. In some embodiments, the initial portion 202 may include enough content items to fill the display area of the user device 102 once, or at least a threshold number of times. Thus, even if a user scrolls, pages, or otherwise navigates past the first few content items without stopping to closely inspect any of them, the content management system 100 will still have time to provide the subsequent portion 204 of content items. Therefore, the user may still be able to scroll, page, or otherwise navigate to those subsequent content items without experiencing an undesirable delay. Illustratively, the first phase may return an initial selection of content to the user device 102 in 100-500 milliseconds (ms), and the subsequent phase may return an additional selection of content to the user device in 1000-5000 ms. For example, the first phase may return the initial selection of content in less than about 250 ms, and the subsequent phase may return the additional selection of content in less than about 4000 ms. Thus, a user may quickly be provided with content having at least a threshold degree of relevance to the user's interests, while also being provided later with content that has a higher degree of relevance to the user's interests. An example process 500 for generating a content feed in multiple phases is shown in FIG. 5 and described in greater detail below.

Content Collection Management Process

Figure 3:
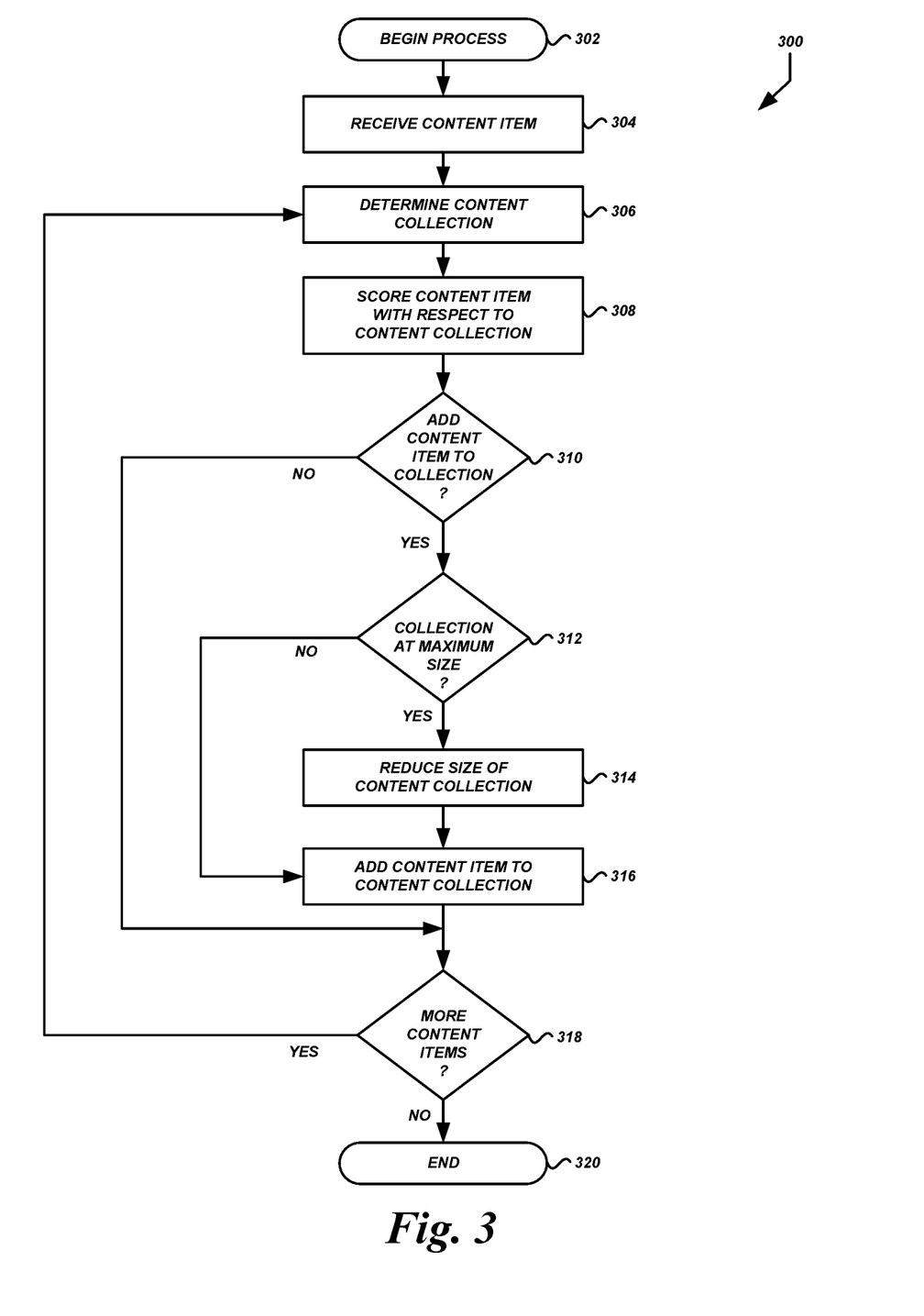
FIG. 3 is a flow diagram of an illustrative process for maintaining content collections according to some embodiments.

FIG. 3 is a flow diagram of an illustrative process 300 for managing content collections. Advantageously, a content management system 100 performing the process 300 may maintain content collections that allow the system 100 to provide content that both (1) is more likely to be of interest to a user than content selected based on general popularity or some other non-personalized criteria, and (2) is presented to the user more quickly than content selected using personalization methods involving a computationally-intensive, content-item-by-content-item analysis.

The process 300 will be described with reference to FIGS. 4A-4C, which are block diagrams of a content collection data structure 400 at various stages during the process 300. The content collection data structure 400 shown in FIGS. 4A-4C includes records corresponding to individual content items. The records may include content identifiers (e.g., network addresses, index numbers, etc.) that can be used to access the content items. The records may also include scores (e.g., relevance scores, click-through probabilities, etc.) that can be used to sort, rank, and/or select individual content items from the content collection. The content collection data structure 400 is illustrative only, and is not intended to be limiting. In some embodiments, a content collection may be implemented using other data types and/or data structures.

The process 300 begins at block 302. The process 300 may begin in response to an event, such as periodic initiation of the process 300 according to a predetermined or dynamically determined schedule, or upon receipt of a new content item to be added to the corpus of available content items. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the content management system 100. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 304, the content analyzer 110 or some other module or component of the content management system 100 may receive a new content item to be added to the corpus of available content. The content item may be or include a post, article, story, document, image, video, audio recording, animation, network resource, some combination thereof, etc. The content item may be provided by, or accessed using, some external content source. For example, a news outlet may provide articles, a weather outlet may provide weather forecasts, a social media network may provide user posts, etc. In some embodiments, the content item may be provided by a user device 102. For example, a user device 102 may transmit a post, article, image, or other content item to the content management system 100 to be distributed to other user devices 102.

At block 306, the content analyzer 110 or some other module or component of the content management system 100 may determine the content collection or collections, if any, to which the content is to be assigned. The content analyzer 110 may determine the content collections using a model, classifier, or some other tool. In some embodiments, the content analyzer 110 can identify particular characteristics or features of the content item received above, such as its subject matter, sentiment, reference to a product, creation date, and the like. The content analyzer 110 can use the identified characteristics or features to match the content item to a content collection or multiple collections based on the characteristics of content items in the collections. For example, the content analyzer 110 may determine that a content item, such as an article about camping that includes an image of a tent, has multiple characteristics that can be used to assign the content item to content collections. Some of the characteristics may include having outdoor activities as a subject, being associated with a particular geographic region, having a picture and discussion of camping products, etc. The content analyzer 110 may assign the content item to multiple content collections, including one or more content collections for content regarding outdoor activities, the identified geographic region, and/or camping products.

At block 308, the content analyzer 110 or some other module or component of the content management system 100 may generate a score indicating a degree to which the content item relates to the interests and other characteristics of the content collection to which the content item has been assigned. The score may also be based on additional features, such as the source of the content item, the date the content item was created, etc. Individual features may be weighted more or less than other features to generate the score. The weights may also be different for different content collections. The score can be used to rank the content item with respect to other items in the content collection. Returning to the example content item regarding camping discussed above, one content collection to which the content item is assigned may be for content that is of particular relevance to users interested in outdoor activities, camping products, organic food, and emerging musical artists. The content analyzer 110 can determine a score reflecting a moderate or high level of relevance to this particular content collection due to the weights used for the features of this particular content item and this collection. A different score can be determined for a different content collection, such as content collection maintained for content related to history, travel, and the same geographic region of the content item. The score for the content item with respect to this additional content collection may be lower than the score determined with respect to the previously-discussed content collection due to the weights used for the features of this particular content item and this additional content collection. The scoring process may be repeated as necessary for each additional content collection to which the content item has been assigned.

At decision block 310, the content analyzer 110 or some other module or component of the content management system 100 may determine whether to add the content to each assigned content collection. The determination may be based on whether the content item has a higher score than a content item currently in the content collection, or otherwise is determined to be more relevant to the topics of the content collection than a content item currently in the content collection. For example, the content analyzer 110 may compare the score determined above at block 308 to the scores for the other content items in the content collection. If the score is greater than a score of a content item currently in the content collection, then the process 300 proceeds to bock 312. Otherwise, if the score of the content item is not greater than the scores of any content item currently in the content collection (or if the content item is not otherwise determined to be more relevant than any content currently in the content collection), the content item may not be added to the content collection.

Removing a content item from a content collection each time a new content item is added to the content collection may cause the content collection to exhibit a large degree of turnover. If the relevance of content items is at least partially based on popularity (e.g., the number of times the content item is viewed, shared, or tagged by users) or some other factor that develops over time, then content items may be removed from the content collection before such factors can be measured. To provide time needed for such factors to develop and be measured, a content item may not necessarily be removed from a content collection even though it is the lowest-scoring content item currently in the collection and a new content item is being added. For example, a content collection may be associated with predetermined or dynamically determined thresholds or size parameters, such as a maximum and minimum number of content items permitted to be in the content collection. Content that has been assigned to a content collection, as described above with respect to block 306, may be added to a content collection as long as doing so will not cause the content collection to exceed its maximum size.

At decision block 312, the content collection manager 112 or some other module or component of the content management system 100 can determine whether adding a current content item to a content collection will cause the number of content items in the content collection to exceed the collection's maximum size. If so, the content collection manager 112 may reduce the number of content items in the content collection at block 314. Otherwise, if adding the content item to the content collection will not cause the size of the content collection to exceed its maximum size, then the content collection manager 112 may add the content item to the content collection at block 316.

Figure 4A:
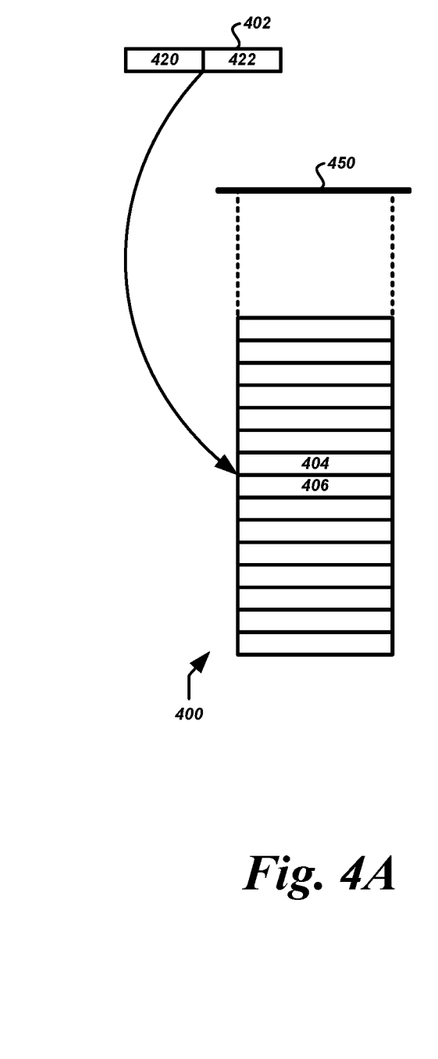
FIGS. 4A, 4B, and 4C are block diagrams of an illustrative content collection data structure at different points during management of the content collection.

FIG. 4A provides a representation of how a content item may be added to a content collection during the process 300. FIG. 4A includes a content collection data structure 400 for a content collection, such as the content collection described above that is maintained for users interested in outdoor activities, camping products, organic food, and emerging musical artists. The content collection manager 112 can generate a record 402 regarding the camping content item described above. The record 402 may include various data regarding the content item, such as an identifier 420 of the content item and a score 422 for the content item. At decision block 312 of the process 300, the content collection manager 112 can determine that the number of content items currently in the content collection, as represented by the number of records in the content collection data structure 400, is below the maximum size 450. In response to this determination, the content collection manager 112 can add the content item to content collection at block 316 by adding the record 402 to the content collection data structure 400. As shown, the record 402 may be inserted into the content collection data structure 400 between existing records 404 and 406.

At decision block 318 of the process 300, the content collection manager 112 or some other module or component of the content management system 100 can determine whether there are additional new content items in the corpus of available content items. If so, the process 300 may return to block 306 for each content item. Otherwise, if there are no more new content items to process, the process 300 may terminate at block 320, or wait at decision block 318 for the receipt of additional new content items.

Figure 4B:
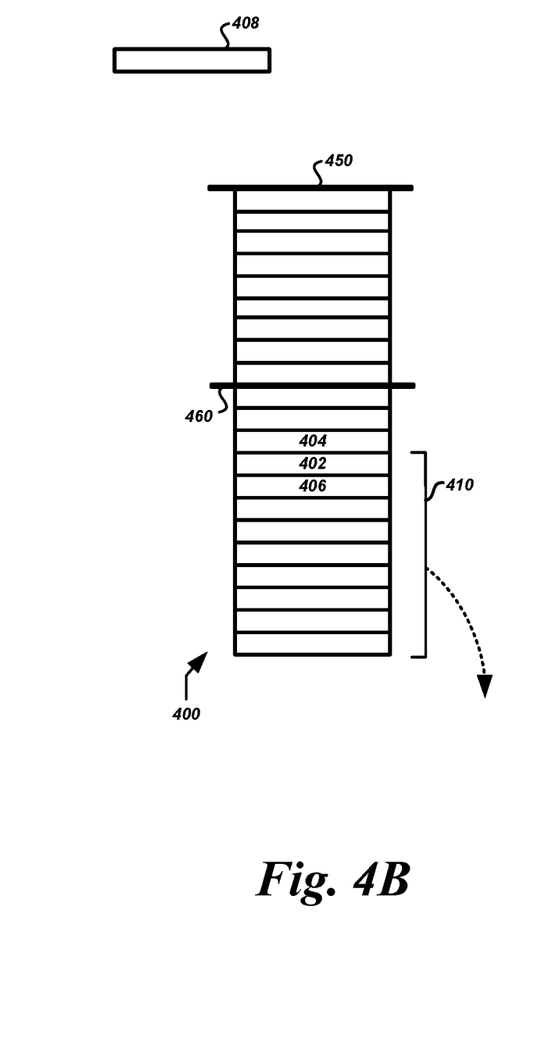
Figure 4C:
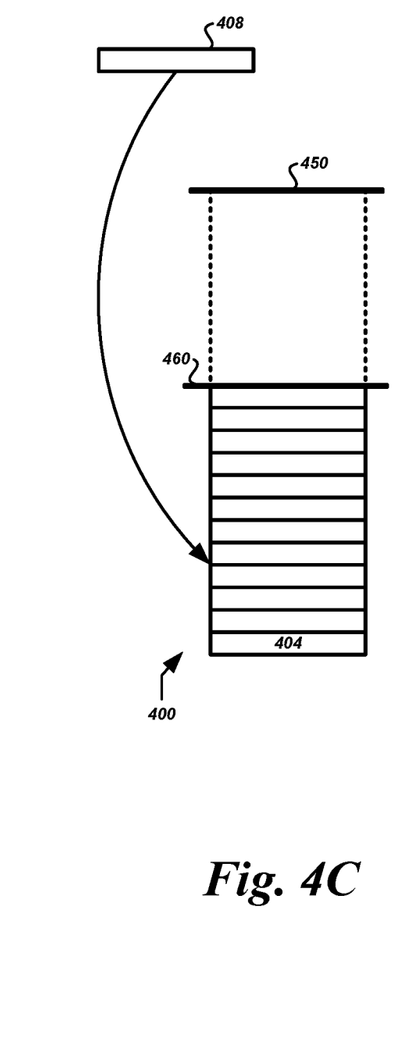

FIGS. 4B and 4C show the processing of another new content item and the determination to first reduce the size of the content collection before adding the new content item. As shown in FIG. 4B, the content collection data structure 400 has reached the upper threshold 450 that corresponds to the maximum size of the content collection. In this case, when the content collection manager 112 reaches decision block 312 of the process 300, the content collection manager 112 can determine to proceed to block 314 in order to reduce the size of the content collection. For example, the content items 410 with the lowest scores may be removed from the content collection data structure 400 to bring the number of records in the data structure 400 down to the lower threshold 460, which corresponds to the minimum size or desired lower size of the content collection. A new record 408 for the new content item may then be added to the content collection data structure, as shown in FIG. 4C.

In some embodiments, prior to removing the content items with the lowest relevance scores, the content collection manager 112 or content analyzer 110 may re-score the content items in the content collection (or some subset thereof). By re-scoring the content items before removing the lowest-scoring content items, the factors that develop over the course of time may be re-considered. In this way, content items that have increased in relevance over the course of time with respect to the target user group of the content collection may be retained within the content collection, even if the previously-determined score was low enough that the content items would be removed. For example, some content items may have changed in popularity over time. An increase in popularity may form the basis of an increase in score, even if the content item is less recent that it was when its score was last determined. As another example, a content item that has already been viewed by a certain portion of users assigned to a content collection may experience a decrease in score due to a desire to provide new content to users. In some embodiments, the content items (or some subset thereof) in a content collection may be rescored each time a new content item is added to the content collection, even if no content items are to be removed at that time. In some embodiments, the content items in a content collection may be rescored periodically on a predetermined or dynamically determined schedule, or in response to the occurrence of some other event.

Multi-Phase Feed Generation Process

FIG. 5 is a flow diagram of an illustrative process 500 for generating a content feed. A content management system 100 performing the process 500 may generate the feed in at least two phases: an initial phase in which content is provided from one or more existing content collections, and a subsequent phase in which content is selected from a larger corpus of available content items on a personalized basis for the user to whom the content feed is to be presented. Advantageously, a user can be quickly provided with content that the user is more likely to find interesting than content that is merely "popular" overall, and the user is then provided with additional content that is determined to be relevant to specific interests and/or characteristics of the user.

The process 500 begins at block 502. The process 500 may begin in response to an event, such as a notification from a user device 102 that a content feed display application 104 has begun execution. When the process 500 is initiated, a set of executable program instructions stored on one or more non-transitory computer-readable media (e.g., hard drive, flash memory, removable media, etc.) may be loaded into memory (e.g., random access memory or "RAM") of a server or other computing device of the content management system 100. The executable instructions may then be executed by a hardware-based computer processor (e.g., a central processing unit or "CPU") of the computing device. In some embodiments, the process 500 or portions thereof may be implemented on multiple computing devices and/or multiple processors, serially or in parallel.

At block, 504, the content feed generator 114 or some other module or component of the content management system 100 may receive a content feed request from a user device 102. In some embodiments, the content feed request may include information identifying the user of the user device 102, the user device 102 itself, the application 104 from which the request originated, etc.

At block 506, the content feed generator 114 or some other module or component of the content management system 100 can determine the content collection (or multiple collections) from which to obtain an initial set of content for the user's content feed. In some embodiments, the user may be assigned to a content collection prior to the time the content management system 100 receives the current content feed request from the user. For example, the user may be assigned to a content collection in an offline process, or during the first execution of the process 500 for a content feed request from the user. In some embodiments, the user may be dynamically assigned to a content collection based on stored information regarding the user's interests, demographic characteristics, geographic location, content browsing history, shopping history, affinity with other users, etc.

At block 508, the content feed generator 114 or some other module or component of the content management system 100 can select content from the content collection(s) determined in block 506 above. For example, the content feed generator 114 may select all content items in the content collection, only the content items that the user has not yet accessed in the content collection, only the content items in the content collection having a score above some threshold, etc. In some embodiments, the content feed generator 114 may select content for the user based on the interests or other characteristics of the user. For example, the content feed generator 114 may use a model or classifier to rank or score the content items in the content collection based on the interests or other characteristics of the user. The content feed generator 114 may then select a portion of the content items determined to be most relevant for the current user.

At block 510, the content feed generator 114 or some other module or component of the content management system 100 can provide the initial portion of the content feed to the user device 102. Illustratively, the data that is transmitted to the user device 102 may include a listing of content items, and links to access the full content items. In some embodiments, the data that is transmitted may include summaries, thumbnails, or previews of the content items. In some embodiments, the content feed generator 114 may provide a set of the actual content items (e.g., a full-text version, a complete video file, etc.) instead of, or in addition to, a listing and/or summaries of content items selected for the user's content feed.

At block 512, the content feed generator 114 or some other module or component of the content management system 100 can identify a second set of content items for the user's content feed. The content feed generator 114 can perform a user-specific analysis to select content based specifically on the interests and/or other characteristics of the user, rather than based on the collective interests of a group with which the user is associated. In some embodiments, the content feed generator 114 may generate a score for substantially all of the content items in the corpus of available content items, or a subset of such content items. For example, features of content items may be identified, and those features may be associated with different weights depending upon features of the specific user for whom a score is being generated.

At block 514, the content feed generator 114 or some other module or component of the content management system 100 can provide a subsequent portion of the content feed to the user device 102. The subsequent portion of the content feed can include a listing of the additional content items identified above at block 512, a summary of content items identified above at block 512, complete versions of the content items identified above at block 512, or some combination thereof. The application 104 on the client device 102 may be configured to seamlessly integrate the subsequent portion into the presentation of the content feed, as shown in FIG. 2.

As shown in FIG. 5, the content feed generator 114 may perform blocks 512 and 514 in parallel with blocks 506, 508, and 510. In some embodiments, blocks 512 and 514 may be may be performed sequentially after blocks 506, 508, and/or 510.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more computing devices in communication with the computer-readable memory, the one or more computing devices programmed by the executable instructions to at least:
   receive, from a first user device, a content item to be added to one or more content collections;
   determine a characteristic of the content item;
   select a content collection from a plurality of content collections, wherein the content collection comprises a first plurality of content items associated with a characteristic of the content collection, and wherein the content collection is selected based at least partly on a degree to which the characteristic of the content item relates to the characteristic of the content collection;
   determine, based on the selected content collection comprising at least a maximum number of content items available for generating a content feed, to remove a subset of the first plurality of content items from the content collection;
   determine a ranking of the first plurality of content items with respect to each other based at least partly on a popularity metric associated with individual content items of the first plurality of content items;
   remove the subset from the content collection based at least partly on the ranking, wherein at least a minimum number of content items available for generating a content feed remain in the content collection after removing the subset;
   add the content item to the content collection;
   receive, from a second user device, a request for a content feed, wherein the request is received subsequent to adding the content item to the content collection;
   generate the requested content feed comprising a second plurality of content items, wherein the content item is included in the second plurality of content items based at least partly on a degree to which the characteristic of the content collection relates to a characteristic of a user of the second user device; and
   transmit the requested content feed to the second user device.

2. The system of claim 1, wherein the characteristic of the content item comprises at least one of: a topic, a geographic location, a product group, a sentiment, a measurement of popularity, or a creation time.

3. The system of claim 1, wherein the ranking is based on a combination of the popularity metric and degree to which a characteristic of each content item relates to the characteristic of the content collection.

4. A computer-implemented method comprising:
   as performed by a content management system comprising a server computing device configured to execute specific instructions,
   selecting a content collection to which a content item is to be added based at least partly on an association of a characteristic of the content item with a characteristic of the content collection;
   determining, based on a number of content items in the content collection satisfying a maximum threshold number of content items available for generating a content feed, to remove a first subset of a plurality of content items from the content collection;
   determining a ranking of the plurality of content items in the content collection with respect to each other based at least partly on a popularity metric associated with individual content items of the plurality of content items;

removing the first subset of the plurality of content items from the content collection based at least partly on the ranking, wherein at least a minimum threshold number of content items available for generating a content feed remain in the content collection; and adding the content item to the content collection based at least partly on a ranking of the content item with respect to a second subset of the plurality of content items, wherein the second subset comprises content items remaining in the content collection.

5. The computer-implemented method of claim 4, wherein the content item comprises at least one of: an article, a review, a story, a document, an image, a video, an audio recording, or an animation.

6. The computer-implemented method of claim 4, wherein the characteristic of the content item comprises at least one of: a topic, a geographic location, a product group, a sentiment, a measurement of popularity, or a creation time.

7. The computer-implemented method of claim 4, wherein the characteristic of the content collection comprises at least one of: a topic of interest to a plurality of users, or a product of interest to the plurality of users.

8. The computer-implemented method of claim 4, wherein the ranking of the plurality of content items with respect to each other is based on a combination of the popularity metric and a determination of relevance of individual content items of the plurality of content items to characteristics of a group of users associated with the content collection.

9. The computer-implemented method of claim 4, further comprising generating a content feed comprising a second plurality of content items selected from content items remaining in the content collection, wherein the content item is included in the second plurality of content items based at least partly on a degree to which the characteristic of the content collection relates to a characteristic of a user of a user device.

10. The computer-implemented method of claim 9, wherein the characteristic of the user comprises at least one of: an interest, a demographic characteristic, a geographic location, a browsing history, a shopping history, or an affinity with other users.

11. The computer-implemented method of claim 4, further comprising determining the association between the characteristic of the content item and the characteristic of the content collection based at least partly on a relevance score, wherein the relevance score indicates a relevance of the content item to characteristics of a group of users associated with the content collection.

12. The computer-implemented method of claim 4, further comprising grouping content items from a corpus of available content items into a plurality of content collections based at least partly on characteristics of groups of users associated with individual content collections of the plurality of content collections.

13. The computer-implemented method of claim 4, further comprising generating a content feed using a multi-phase feed generation process comprising:

selecting a third subset of content items from the content collection based at least partly on an association between a characteristic of the content collection and a user of a user device;

transmitting information regarding the third subset of content items to the user device, wherein the information regarding the third subset of content items comprises one of: a listing of content items in the third subset of content items, links to content items in the third subset of content items, or previews of content items in the third subset of content items;

selecting a fourth subset of content items of a corpus of available content items based at least partly on an association between the characteristic of the user and content characteristics of individual content items of the fourth subset of content items, wherein the fourth subset of content items is selected in parallel with transmission of at least a portion of the third subset of content items; and transmitting information regarding the fourth subset of content items to the user device, wherein the information regarding the fourth subset of content items comprises one of: a listing of content items in the fourth subset of content items, links to content items in the fourth subset of content items, or previews of content items in the fourth subset of content items.

14. The computer-implemented method of claim 13, wherein a degree of relevance, with respect to a characteristic of the user, of a content item in the third subset of content items is lower that a degree of relevance, with respect to the characteristic of the user, of a content item in the fourth subset of content items, and wherein an amount of time to select the third subset of content items is less than an amount of time to select the fourth subset of content items.

15. A system comprising:

a computer-readable memory storing executable instructions; and one or more computing devices in communication with the computer-readable memory, the one or more computing devices programmed by the computer-executable instruction to at least:

select a content collection to which a content item is to be added based at least partly on an association of a characteristic of the content collection;

determine, based on a number of content items in the content collection satisfying a maximum threshold number of content items available for generating a content feed, to remove a first subset of a plurality of content items from the content collection;

determine a ranking of the plurality of content items in the content collection with respect to each other based at least partly on a popularity metric associated with individual content items of the plurality of content items;

remove the first subset of the plurality of content items from the content collection based at least partly on the ranking, wherein at least a minimum threshold number of content items available for generating a content feed remain in the content collection after removing the first subset;

add the content item to the content collection based at least partly on a ranking of the content item with respect to a second subset of the plurality of content items, wherein the second subset comprises content items remaining in the content collection; and generate a content feed comprising a second plurality of content items, wherein the content item is included in the second plurality of content items based at least partly on a degree to which the characteristic of the content collection relates to a characteristic of a user of a user device.

16. The system of claim 15, wherein the content item is included in the second plurality of content items based further on the ranking of the content item with respect to the second plurality of content items.

17. The system of claim 15, wherein the ranking of the plurality of content items with respect to each other is based on a combination of the popularity metric and a determination of relevance of individual content items of the plurality of content items to characteristics of a group of users associated with the content collection.

18. The system of claim 15, wherein the one or more computing devices are further programmed to at least:
  transmit information regarding the second plurality of content items to the user device, wherein the information regarding the second plurality of content items comprises one of: a listing of content items in the second plurality of content items, links to content items in the second plurality of content items, or previews of content items in the second plurality of content items;
  select a third plurality of content items of a corpus of available content items based at least partly on an association between the characteristic of the user and content characteristics of individual content items of the third plurality of content items, wherein the third plurality of content items is selected in parallel with transmission of at least a portion of the second plurality of content items; and
  transmit information regarding the third plurality of content items to the user device, wherein the information regarding the third plurality of content items comprises one of: a listing of content items in the third plurality of content items, links to content items in the third plurality of content items, or previews of content items in the third plurality of content items.

19. The system of claim 18, wherein a degree of relevance, with respect to a characteristic of the user, of a content item in the second plurality of content items is lower than a degree of relevance, with respect to the characteristic of the user, of a content item in the third plurality of content items, and wherein an amount of time to select the second plurality of content items is less than an amount of time to select the third plurality of content items.

20. The system of claim 15, wherein the one or more computing devices are further programmed to at least determine the association between the characteristic of the content item and the characteristic of the content collection based at least partly on a relevance score indicating a relevance of the content item to characteristics of a group of users associated with the content collection.

21. The system of claim 15, wherein the popularity metric represents one of: a number of times a content item is viewed, a number of times a content item is shared, or a number of times a content item is tagged by users.

* * * * *